D. WELLINGTON.
Water-Closet.

No. 209,996.  Patented Nov. 19, 1878.

Witnesses.
W. J. Pratt.
E. C. Perkins.

Inventor.
Darius Wellington
by Crosby Gregory
Attys

2 Sheets—Sheet 2

D. WELLINGTON.
Water-Closet.

No. 209,996. Patented Nov. 19, 1878.

Witnesses.
W. J. Pratt.
E. C. Perkins.

Inventor.
Darius Wellington
by Crosby Gregory
Attys

UNITED STATES PATENT OFFICE.

DARIUS WELLINGTON, OF BOSTON, MASSACHUSETTS.

IMPROVEMENT IN WATER-CLOSETS.

Specification forming part of Letters Patent No. 209,996, dated November 19, 1878; application filed July 30, 1877.

*To all whom it may concern:*

Be it known that I, DARIUS WELLINGTON, of Boston, in the county of Suffolk and State of Massachusetts, have invented an Improvement in Water-Closets, of which the following is a specification:

This invention relates to improvements in water-closets, and has for its object the manufacture of a closet from which unpleasant odors cannot rise.

The pan is provided at its bottom with a suitable leather or soft-rubber packing, which meets the lower or downwardly-projecting portion of the bowl-support, or it might be the bowl, and forms a close, tight joint when the pan is closed. This pan is held locked in its upward or closed position by means of a lever having a toe, which acts on a portion of an arm projecting from a rock-shaft, a second arm thereon carrying the pivoted pan.

The bowl is sustained on a metallic frame, provided with a supporting-flange inside a vertical rim, by means of fastening devices—set-screws or equivalents. The bowl is supplied near its lower portion with an outlet, to permit the water to run out down to such a level as will leave just enough water to remain in the bowl and assist in trapping the gases, should any pass between the pan-packing and the surface in contact with it.

The special features of this invention are as hereinafter set forth and claimed.

Figure 1:
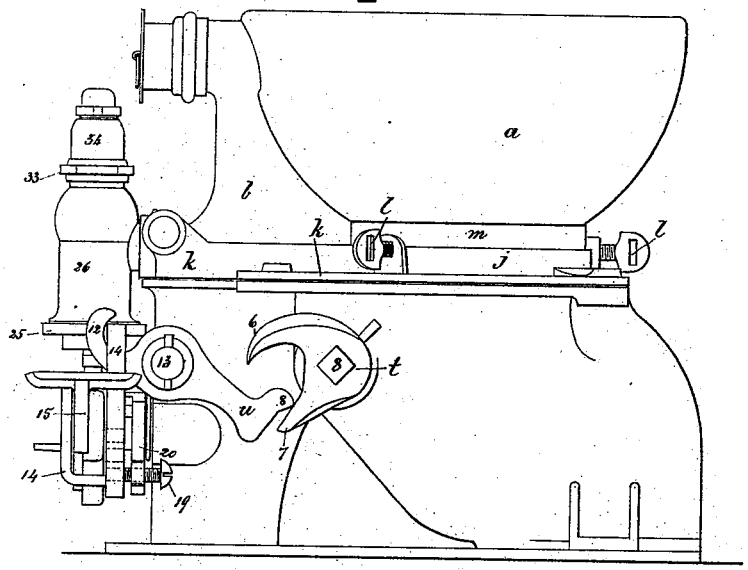
Figure 2:
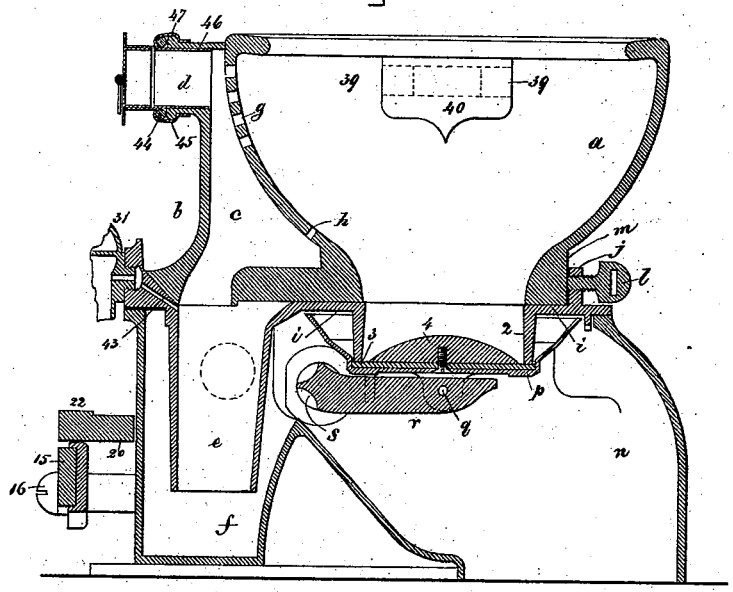
Figure 3:
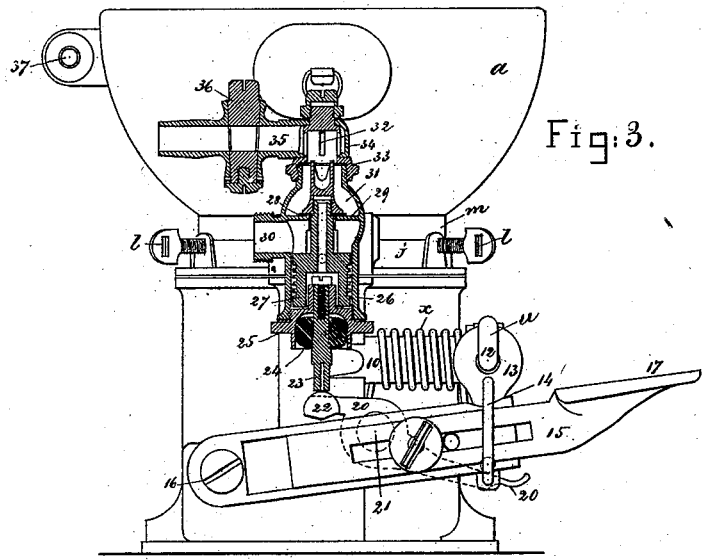

Figure 1 represents, in side elevation, an apparatus embodying my invention; Fig. 2, a vertical section thereof; Fig. 3, an end view, the water-valve being in section; and Fig. 4, a top view thereof.

The bowl $a$, of porcelain or metal, has a lateral extension, $b$, in which is made a passage, $c$, connected, if desired, with a ventilating-flue pipe, $d$, and leading at bottom into a pipe, $e$, projecting downward into a water space or leg, $f$, made in the receiving-base, so that the water, acting in conjunction with such pipe, serves the purpose of a stench-trap.

Openings $g$ serve as the overflow for the bowl, and below such openings is a gage-passage, $h$, to permit the discharge of the water in the bowl down to a proper level. The bowl has its seat on a ledge, $i$, within a rim, $j$, of a bowl-sustainer, $k$, having, in this instance, the pipe $e$, formed as a part thereof, and having an extension, 2, to enter and bear against the packing 3 in the bottom of the pan.

The bowl, having at its lower end a rim, $m$, preferably annular, is confined in position in the bowl-sustainer by means of fastening devices, shown as screws or thumb-nuts $l$.

The receiver $n$, connected at its lower end with, or placed in usual position with reference to, the usual vertical waste-pipe, is preferably made of cast-iron, and is adapted to sustain upon its top the parts hereinbefore described.

The pan $p$, having the packing 3 and a convex bottom-piece, 4, made as a weight, has ears, (shown in dotted lines, Fig. 2,) by which the pan is pivoted at $q$ to an arm, $r$, projecting from a rock-shaft, $s$, suitably sustained in the iron frame of the receiver. This rock-shaft has an arm, $t$, forked as at 6 7.

The rock-shaft is moved so as to lower the pan and discharge its contents into the receiver by the action of a striking-lever, $u$, against the portion 6; and the rock-shaft is turned to press the packing 3 snugly against the portion 2, to keep the pan elevated to prevent the passage of gas or fluid between 2 and the packing, by the action of the striking-lever against the portion 7 of the arm $t$.

When the lever $u$ and arm $t$ are in the position shown in Fig. 1, the toe 8, acting on the portion 7 below the center of the rock-shaft, retains the pan fixedly in the position shown in Fig. 2.

The pivoted pan readily adapts itself to the end of the extension or pipe 2 below the bowl, making a tight joint. This joint is further sealed and made air-tight by means of water in the pan at the inner and outer portions of the pipe 2.

The lever $u$ is mounted loosely on a stud, $w$, surrounded by a spiral spring, $x$, connected at one end with the stud, and at its other end with an auxiliary arm, 10, having its fulcrum on the stud $w$, and connected by screw or pin 11 with lever $u$, so as to cause the spring to hold the outer end of the arm $t$ depressed, as in Fig. 1.

The short end of this arm $t$ has a hook, 12, which enters an eye, 13, of a link or loop, 14, to receive the foot-lever 15, pivoted at 16, provided with a foot-pad, 17, and made in two parts, and adjustable by a set-screw or equivalent at 18.

The pan is lowered by the pressure of the foot on the pad of lever 15. This link 14 has an adjustable stud, 19, adapted, when the lever 15 is depressed, to operate a valve-opening lever, 20, pivoted on a stud, 21. (Shown in dotted lines, Fig. 3.)

When the end 22 of the lever 20 is elevated it lifts the loose spindle 23, connected with a depressing-spring, (shown as an india-rubber ring, 24,) into which the spindle is crowded.

This spring, it will be noticed, is held in the socketed piece 25, screwed into the base of the valve-shell 26, and is not exposed to the action of the fluid in the valve-shell.

This spindle is shown as made to increase in size toward its lower end, and the spring acting thereon exerts a force sufficient to throw the spindle down against the end 22 of the lever 20. At the upper end of this spindle is a screw, (see Fig. 3,) the head of which prevents the spindle descending too low.

When this spindle is elevated by the lever 20, its upper end strikes the lower end of the valve 27 and lifts it. This valve is properly guided at its upper end, so as to be reciprocated, and is provided with a packing, 28, and a collar above it, the packing co-operating with a seat, 29. When lifted, water, coming in at the inlet 30, rises through the ways 31, and out through openings 32, of any proper number, arranged in a hub, 33, screwed to the top of the valve-shell. This hub has fitted to it the cup-like end of a swivel-pipe, 35, provided with a plug-valve, 36.

The water, flowing through the valve-chamber and the pipe 35, by means of a suitable connecting-pipe, (unnecessary to be shown,) is led into the pipe 37, having a collar and a projecting end beyond it, to fit a properly-packed bearing in a water-receiving chamber, 38, in a projecting portion forming part of the bowl.

Figure 4:
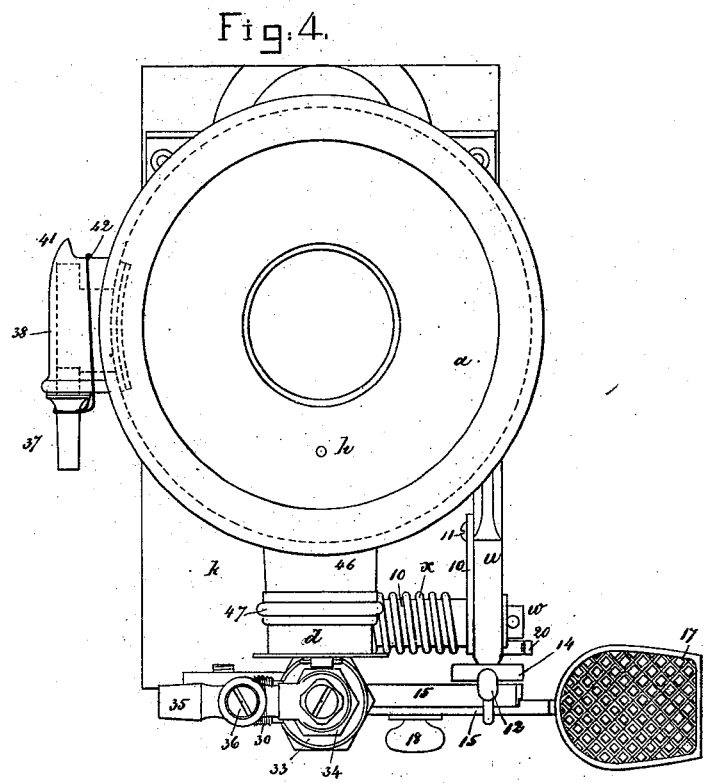

This chamber 38 is hollow, as shown in dotted lines, Fig. 4, and water discharged into it is emptied into the bowl through passages 39, (see Fig. 2,) such passages being covered by a fender, 40, to prevent the water spurting toward the center of the bowl.

The projection 41, at the end of the block or portion which contains the chamber 38, assists in retaining fixedly in place a wire or equivalent, 42, (see Fig. 4,) by which the pipe 37 may be held in place in the porcelain or vitreous portion of the bowl $a$.

The drip-water from the valve-case passes through a channel-way, 43, into the water-leg $f$.

The flue-pipe $d$ may be connected in any usual or suitable way with a flue in the building, or a chimney, or may be closed up.

To apply this flue-pipe cheaply, quickly, and effectually, a rim, 44, is formed about the pipe, and one, 45, about the portion 46 of the bowl, within which the pipe is introduced, and about these two ribbed portions is placed a strong band of india-rubber, 47.

This apparatus may be covered in any usual way with a hole-board and case, if desired. The case is, however, unnecessary.

The convex bottom-piece 4 causes the entire contents of the pan to be dumped easily, and is an improvement on a pan with a concave bottom.

I claim—

1. In a water-closet, the combination, with a projecting portion, 2, of a centrally-pivoted pan, packed at its bottom to meet the portion 2 gas-tight, and provided with upwardly-projecting sides to surround the end of portion 2, whereby the pan may also hold sufficient water to immerse and cover the lower end of portion 2, all substantially as and for the purpose described.

2. The horizontal rock-shaft and its pan-carrying arm, in combination with the pan pivoted to the arm, to operate substantially as set forth.

3. The pivoted pan, its carrying-arm, and rock-shaft, in combination with a forked arm and lever to operate it to upset the pan, or lock it in closed position, substantially as described.

4. The lever $u$, provided with toe 8 and a spring to depress the lever, in combination with the portion of the arm $t$ of the pan rock-shaft, to hold the pan up in closed position, substantially as described.

5. The adjustable foot-lever, in combination with the loop 14, lever $u$, and forked arm $t$, to operate the pan-operating rock-shaft, substantially as described.

6. The valve-opening lever and loose spindle 23, in combination with the independent valve and valve-shell, substantially as described.

7. The valve-opening lever and loose spindle, in combination with the valve and valve-shell and spindle-depressing spring arranged outside the valve-shell to depress the spindle, substantially as described.

8. The water-receiving chamber 38, provided with a projection, 41, substantially as described.

9. The receiver $n$, arranged directly below the pan and the bowl, and provided with the water-leg $f$, in combination with the bowl-support connected therewith and provided with a pipe, $e$, to extend into the water-leg, substantially as described.

10. The bowl provided with the overflow-openings and with a water-regulating opening, $h$, substantially as described.

11. The bowl and its projecting portion provided with a passage, $e$, to discharge its water into a water-leg, in combination with an extension, 46, for the reception of a ventilating-flue pipe, substantially as described.

12. The combination, with a pipe or extension, 2, of a vertically-swinging lever, a pan pivoted to the lever and adapted to abut against the end of the pipe, and with devices to move the swinging lever and lock it in position to hold the pivoted pan against the end of the pipe.

In testimony whereof I have signed my name to this specification in the presence of two subscribing witnesses.

DARIUS WELLINGTON.

Witnesses:
G. W. GREGORY,
S. B. KIDDER.